US011885475B2

(12) United States Patent
Debiard et al.

(10) Patent No.: US 11,885,475 B2
(45) Date of Patent: Jan. 30, 2024

(54) LIGHTING DEVICE FOR AN OFF-ROAD UTILITY VEHICLE

(71) Applicant: Valeo North America, Inc., Troy, MI (US)

(72) Inventors: Alexis Debiard, Troy, MI (US); Fernando Javier Villanueva, Troy, MI (US)

(73) Assignee: Valeo North America, Inc., Troy, MI (US)

( * ) Notice: Subject to any disclaimer, the term of this patent is extended or adjusted under 35 U.S.C. 154(b) by 0 days.

(21) Appl. No.: 17/831,646

(22) Filed: Jun. 3, 2022

(65) Prior Publication Data

US 2023/0392767 A1 Dec. 7, 2023

(51) Int. Cl.

| | |
|---|---|
| ***F21S 45/48*** | (2018.01) |
| ***F21S 41/141*** | (2018.01) |
| ***F21S 41/29*** | (2018.01) |
| ***F21S 45/33*** | (2018.01) |
| ***F21S 45/49*** | (2018.01) |
| ***F21S 45/50*** | (2018.01) |
| *F21Y 115/10* | (2016.01) |

(52) U.S. Cl.

CPC ............ *F21S 45/48* (2018.01); *F21S 41/141* (2018.01); *F21S 41/29* (2018.01); *F21S 45/33* (2018.01); *F21S 45/49* (2018.01); *F21S 45/50* (2018.01); *F21Y 2115/10* (2016.08)

(58) Field of Classification Search

CPC .......... F21S 41/141; F21S 45/50; F21S 45/48; F21S 45/49; F21S 45/47; F21Y 2115/10; F21W 2102/30; F21W 2102/19; F21W 2103/10; F21W 2103/55; F21W 2102/00; F21W 2107/10; B60Q 1/20; B60Q 1/18; F21V 29/74; F21V 31/005

See application file for complete search history.

(56) References Cited

U.S. PATENT DOCUMENTS

| | | | | |
|---|---|---|---|---|
| 4,862,337 A * | 8/1989 | Ohshio | .................. | F21S 45/33 362/519 |
| 8,231,254 B2 | 7/2012 | Beck et al. | | |
| 8,829,539 B2 | 9/2014 | Kleo et al. | | |
| 9,651,152 B2 | 5/2017 | Lesnau, IV et al. | | |

(Continued)

FOREIGN PATENT DOCUMENTS

| | | |
|---|---|---|
| CN | 206191286 U * | 5/2017 |
| CN | 113375122 A * | 9/2021 |

OTHER PUBLICATIONS

Search English translation of CN 113375122 A (Year: 2021).*
Search English translation of CN-206191286-U (Year: 2017).*

*Primary Examiner* — Omar Rojas Cadima
(74) *Attorney, Agent, or Firm* — Valeo North America, Inc.

(57) ABSTRACT

The present invention pertains to lighting device systems or methods applicable to off-road utility vehicles. The concepts include light sources for light beam production, a housing enclosure that encompasses internal elements and includes opposing front and rear portions. Inventive concepts further include a heatsink arrangement along an outer surface of the rear portion via a fastening system that is configured to transfer generated heat from the light sources and includes a sealing member with fasteners for securing the heatsink through the housing such that the sealing member becomes positioned between the heatsink and interfacing housing structures.

20 Claims, 5 Drawing Sheets

(56) References Cited

U.S. PATENT DOCUMENTS

| | | | | |
|---|---|---|---|---|
| 10,808,912 | B2 | 10/2020 | Chen et al. | |
| 2011/0193480 | A1* | 8/2011 | Bauer | B60Q 1/2696<br>362/477 |
| 2014/0233252 | A1* | 8/2014 | Shibata | B60Q 1/007<br>362/547 |
| 2017/0336046 | A1* | 11/2017 | LaMarche | B60Q 1/2615 |
| 2019/0093851 | A1* | 3/2019 | Johnson | F21S 45/43 |

* cited by examiner

LIGHTING DEVICE FOR AN OFF-ROAD UTILITY VEHICLE

TECHNICAL FIELD

The present invention generally relates to a vehicle lighting device, and more particularly, to a sealed headlamp assembly applicable to off-road utility vehicles.

BACKGROUND OF THE INVENTION

Lighting devices are an integral part of automotive vehicles. And such lighting devices may represent various types such as headlamps, tail lamps, signal lamps, and the like, which may be used for different functions of the automotive vehicle. Different types of lighting devices are assembled in such a way to perform different lighting functions. For example, headlamps may include different components such as a light source, a reflector, a heatsink, and the like assembled inside a housing in order to provide a light output that enables a driver or vehicle operators with clear visibility of objects along the road or driven pathways. Headlamp assemblies have continuously evolved over years and have undergone major changes to meet the requirements for various types of automobiles such as passenger vehicles, trucks, off-road utility vehicles, and the like. An off-road utility vehicle is one that is designed to work in alternate terrains where roads may not exist or on less than ideal road conditions. In addition, off road utility vehicles are designed to function in difficult weather conditions such as extreme heat, rain, snow, wind, dust and the like.

Conventionally, headlamps for an off-road utility vehicle is similar to a consumer vehicle wherein the heatsink may be placed inside the housing. However, the presence of the heatsink placement inside the headlamp housing typically increases cross sectional housing areas along with affecting increased weight for off-road utility vehicles. In addition, the presence of heatsink fins inside a housing increases the empty space volume inside the housing, which is an undesirable factor for off-road utility vehicles. As an off-road utility vehicle operates in extreme weather or environmental conditions like rain, water, dust, moisture and the like, these environmental elements may become trapped within the housing's empty space to promote or result in corrosion, sub-optimal performance, and reduced headlamp life. Furthermore, a large housing is required to accommodate an interior heatsink that results in increased manufacturing costs. In addition, the current state of requiring a larger number of fastening hardware and a more complex sealing mechanism to ensure reliable sealing has an effect of increasing headlamp assembly times and working staff costs.

The "background" described herein is for purposes of presenting a general context of the disclosure. Work development efforts of the presently named inventors, to the extent it is described in this background section, as well as embodiments of the description (which may not otherwise qualify as conventional art at the time of filing) are neither expressly nor impliedly admitted as prior art against the present disclosure.

BRIEF SUMMARY OF THE INVENTION

The present invention is directed to improved lighting devices for off-road utility vehicles that address at least one or more of the described issues mentioned previously. It is believed that one potential benefit of the present invention over the prior art is that the inventive lighting device is constructed and configured in such a way that the heatsink is disposed outside the lighting device's housing. An innovative arrangement that results in a housing's area space reduction that captures additional empty space due to containment of the presented heatsink within the housing that can include a heatsink subassembly. Moreover, the present invention provides the benefit of a more simplified fastening mechanism to seal the housing thereby reducing the required assembly time of the lighting device. Furthermore, an additional objective of the present invention facilitates improvements to protect against moisture, dust, environmental contaminants and the like on the lighting device assembly by completely sealing the housing space while eliminating empty space inside. The present invention also minimizes or reduces vibrational effects that occur when an off-road utility vehicle operates on harsh road or terrain conditions that adversely affect the lighting device. Thus, lighting device efficiency and longevity is increased when the inventive concept is applied on off-road utility vehicles.

Accordingly pursuant to one embodiment of the present invention, a contemplated lighting device arrangement for off-road vehicles includes: a light source for producing a light beam; a housing enclosure configured to house the light source, wherein the housing enclosure includes a front portion and a rear portion disposed opposite to the front portion; and a heatsink assembled on an outer surface of the rear portion by a fastening system that is configured to transfer heat generated by the light source, wherein the fastening system includes a sealing member and at least one fastener for securing the heatsink to the housing enclosure such that the sealing member is positioned between the heatsink and the housing enclosure.

The invention can be further characterized by one or any combination of the features described herein, such as wherein the fastener is configured to be interfaced in conductive-thermal contact and fastened through the heatsink and the sealing member to secure the heatsink with the housing enclosure to produce a press-fitted compression function of a unitarily formed sealing member.

Accordingly, pursuant to another embodiment of the present invention, the lighting device can further include a transparent cover attached to the front portion of the housing enclosure.

The invention can be further characterized by one or any combination of the features described herein, such as wherein at least a part of the heatsink is in thermal contact with the light source.

The invention can be further characterized by one or any combination of the features described herein, such as wherein the fastener is at least one of a mechanical structural means or an intermediate insert. And fasteners by way of example can include but are not limited to screws, bolts, rivets, toggles, anchors, nuts, spring locks, mechanical connectors, welds or any combinational arrangement thereof or any suitable means of attachment.

The invention can be further characterized by one or any combination of the features described herein, such as wherein the sealing member is formed or manufactured from one or more of polymeric, elastomeric, rubber-like or silica material.

The invention can be further characterized by one or any combination of the features described herein, such as wherein the light source is a light emitting diode (LED) or any alternately suitable luminous light source.

The invention can be further characterized by one or any combination of the features described herein, such as wherein the fastening system further comprises a protection member configured to protect the fastener.

The invention can be further characterized by one or any combination of the features described herein, such as wherein the heatsink comprises a plurality of fins arranged alongside or in parallel to one another.

The invention can be further characterized by any one of a combination of the features described herein, such as wherein the plurality of fins are arranged in a vertical plane that is configured to connect with the sealing member.

The invention can be further characterized by any one or any combination of the features described herein, such as the lighting device further includes a vent disposed at the rear portion of the housing enclosure.

Accordingly, pursuant to another embodiment of the present invention, a method of assembling a lighting device for an off-road utility vehicle is contemplated where the method includes: providing a light source for producing a light beam; providing a housing enclosure configured to house the light source, wherein the housing enclosure includes a front portion and a rear portion disposed opposite to the front portion; assembling a heatsink on an outer surface of the rear portion by a fastening system, the heatsink being configured to transfer heat generated by the light source, wherein the fastening system includes a sealing member and at least one fastener for securing the heatsink to the housing enclosure such that the sealing member is assembled between the heatsink and the housing enclosure. The fastening system further promotes a press-fitted compression function of a unitary formed, curvilinear-shaped sealing member within the lighting device's housing enclosure.

The invention can be further characterized by one or any combination of the features described herein, such as the fastener being configured to interface through conductive-thermal contact and be fastened through the heatsink and the sealing member to secure the heatsink in place with the housing enclosure.

Accordingly pursuant to another embodiment of the present invention, the method can further include attaching a transparent cover to the front portion of the housing enclosure.

The invention can be further characterized by any one of a combination of the features described herein, such as wherein the heatsink comprises a plurality of fins arranged alongside or in parallel to one another.

The invention can be further characterized by one or any combination of the features described herein, such as wherein the plurality of fins are arranged in a vertical plane that is configured to connect with the sealing member.

The invention can be further characterized by one or any combination of the features described herein, such as wherein at least a part of the heatsink is in thermal contact with the light source.

The invention can be further characterized by one or any combination of the features described herein, such as wherein the fastening system further comprises a protection member configured to protect the fastener.

Accordingly, pursuant to another embodiment of the present invention, the method can further include disposing a vent at the rear portion of the housing enclosure.

The invention can be further characterized by one or any combination of the features described herein, such as wherein the sealing member is made by using polymeric, elastomeric, rubberized or silica material.

It should be appreciated that the above referenced embodiments and examples are non-limiting, as other inventive embodiments exist within the present invention, as is shown and described herein.

BRIEF DESCRIPTION OF DRAWINGS

To further provide a more encompassing description and a better understanding of the invention, a set of drawings is provided. The drawings form an integral part of the description and illustrate the various embodiments of the invention, which should not be construed as restricting the scope of the invention but only as examples of how the invention can be carried out. The drawings include the following characteristics.

DETAILED DESCRIPTION OF THE INVENTION

The present invention relates to an improved lighting device for off-road utility vehicles. The lighting device is configured such that empty space is minimized inside the lighting device's housing. Also, the lighting device is capably adapted to withstand induced vibrations that occur from harsh road and off-road utility vehicle operating conditions. The inventive concept of the lighting device's arrangement ensures a water-tight enclosure thereby protecting associated lighting components from moisture and contamination. Furthermore, another objective is achieved with a reduction of the required number of components for enabling a sealed lighting device enclosure that reduces component costs and assembly times. Moreover, through the present invention's implementation, the inventive concept dissipates light source heat generation with a novel assembly arrangement without requiring the heatsink being containably restricted to just within the housing. Thus, the inventive concept associated with this lighting device arrangement achieves advantages of size reduction and extended service life from improved heat dissipation by adoption of a novel structural assembly arrangement.

Unless defined otherwise, all technical and scientific terms used herein have the same meaning as commonly understood by one of ordinary skill in the art to which this technology belongs.

Figure 1:
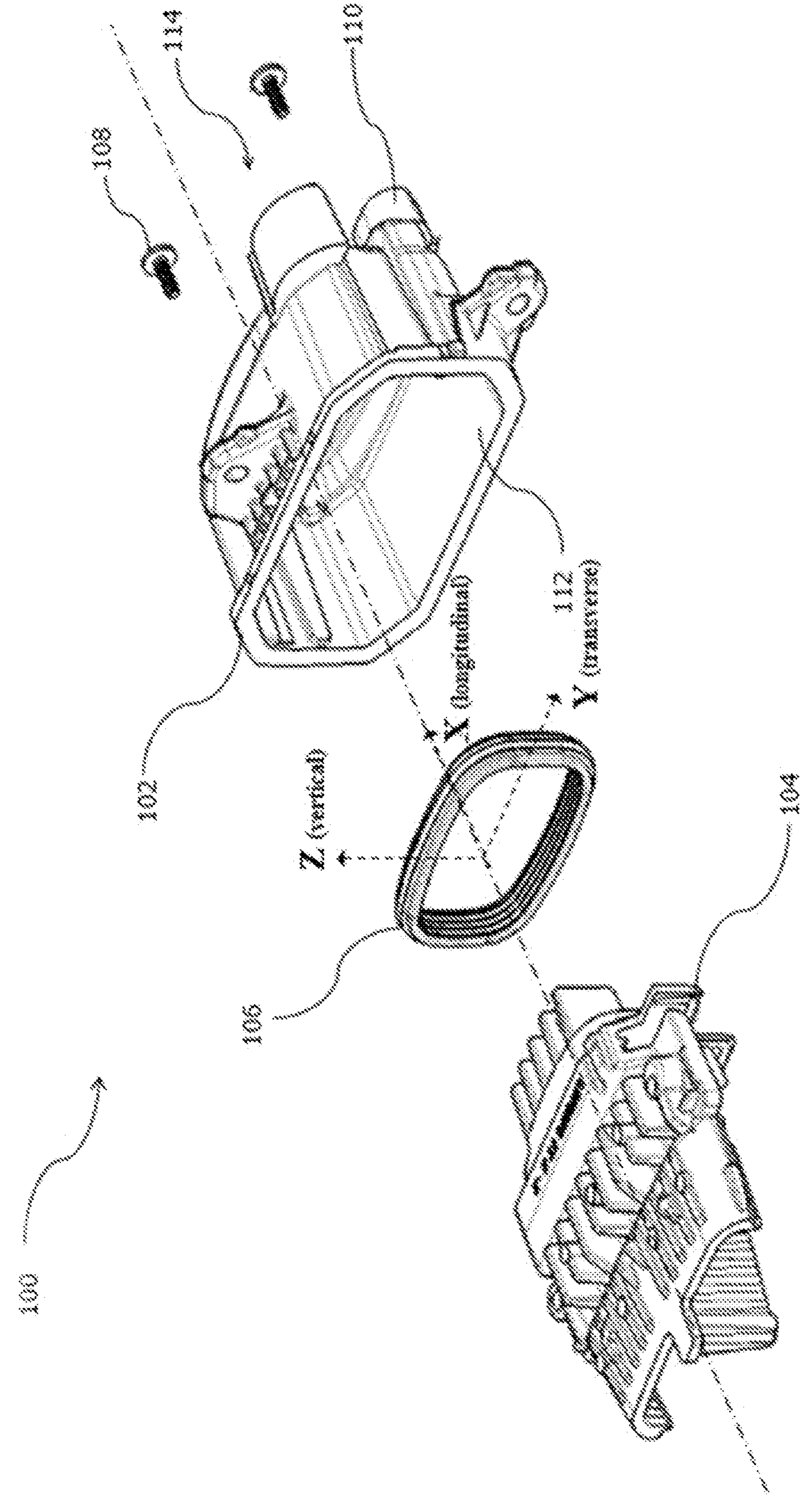
FIG. 1 shows an exploded view of a lighting device, according to an embodiment of the present invention.

FIG. 1 shows an exploded view of a lighting device 100, according to an embodiment of the present invention. The lighting device 100 for an exemplary off-road utility vehicle shown in FIG. 1 comprises a light source (described but not shown in Figures), a housing enclosure 102, a heatsink 104, a sealing member 106 and fasteners 108. In an embodiment, the light source can represent a light emitting diode (LED) or a suitably alternative functional equivalent. The housing enclosure 102 includes a front portion 110 and a rear portion 112 disposed opposite to the front portion 110. The light source is disposed on the front portion 110 of the housing enclosure 102. The heatsink 104 is assembled on an outer surface of the rear portion 112 via the sealing member 106 and the fasteners 108. Furthermore, the heatsink 104 is configured to transfer heat generated by the light source by being in thermal contact with the housing enclosure 102. The sealing member 106 and the fasteners 108 form a fastening system 114. The fastening system 114 ensures that the heatsink 104 is engaged with the housing enclosure 102. An assembly of the heatsink 104 with the housing enclosure 102 via the fastening system 114 can be understood in further detail with respect to FIG. 2.

Figure 2:
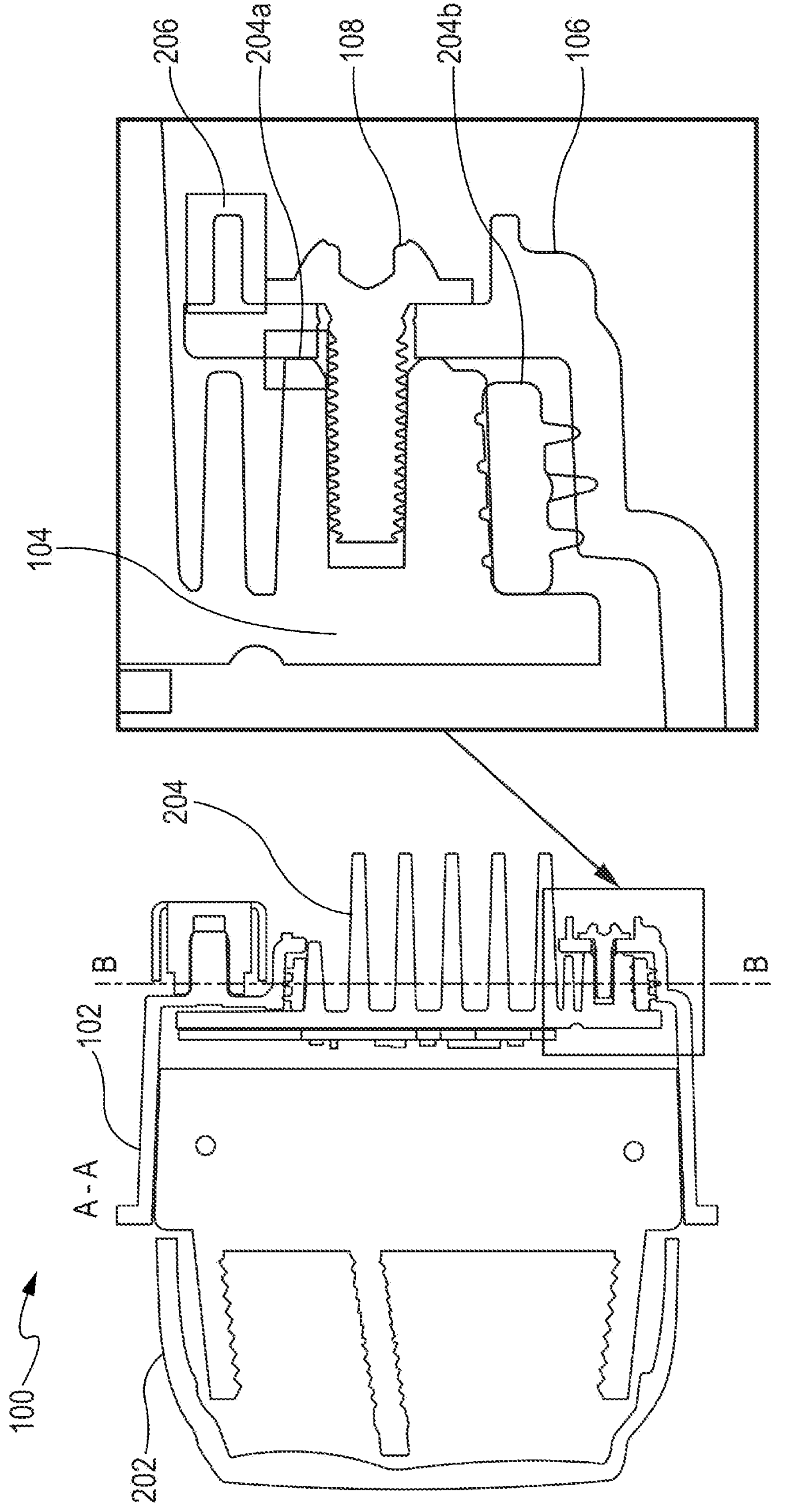
FIG. 2 shows a section perspective and detail view of the lighting device along plane A-A, according to an embodiment of the present invention.

FIG. 2 shows a section's perspective view and detail view of the lighting device 100 along plane A-A, according to an embodiment of the present invention. Lighting device 100 includes a transparent cover 202 attached to the front portion 110 of the housing enclosure 102. Housing enclosure 102 is engaged with the heatsink 104 at the rear portion 112 of the housing enclosure 102 by means of the fastening system 114. As can be seen from the enlarged detail view, the heatsink 104 is attached to the housing enclosure 102 by means of a fastener i.e., the fastener 108 of the fastening system 114. The fasteners 108 are configured to be fastened through the heatsink 104 and the sealing member 106 to secure the heatsink 104 with the housing enclosure 102. In an embodiment, the sealing member 106 is disposed entirely inside the housing enclosure 102. Fastening system 114 further includes a protection member 206 configured to protect the fasteners 108. In an embodiment, the protection member 206 can represent a screw cap or a covering protector. The fastening system 114 secures the heat-sink 104 through the outside of the housing enclosure 102 via the sealing member 106 thereby preventing moisture and other dust particles or contaminants from entering the housing enclosure 102 of the lighting device 100. Heatsink 104 includes a plurality of fins 204 in thermal contact with the light source to dissipate heat generated by the light source. In an embodiment, the plurality of fins 204 are arranged alongside to one another. In an embodiment, the plurality of fins 204 are arranged in parallel to one another. In an embodiment, the plurality of fins 204 are arranged alongside or in parallel to one another. In another embodiment, the plurality of fins 204 are arranged in a vertical plane that is configured to connect with the sealing member 106 as shown in the seal cross section 204*b*. A vent 208 is disposed at the rear portion 112 of the housing enclosure 102 in order to allow air-flow or allow excess water drainage or to reduce dust particles that can potentially enter the lighting device 100 when off-road utility vehicles operate in extreme road or off-road or severe weather conditions. In an embodiment, the fastener 108 locations along the sealing member 106 can be varied to modify thickness values around the vent 208. The fastening system's 114 arrangement and the housing enclosure 102 with the sealing member 106 is explained in more detail with respect to FIG. 3.

Figure 3:
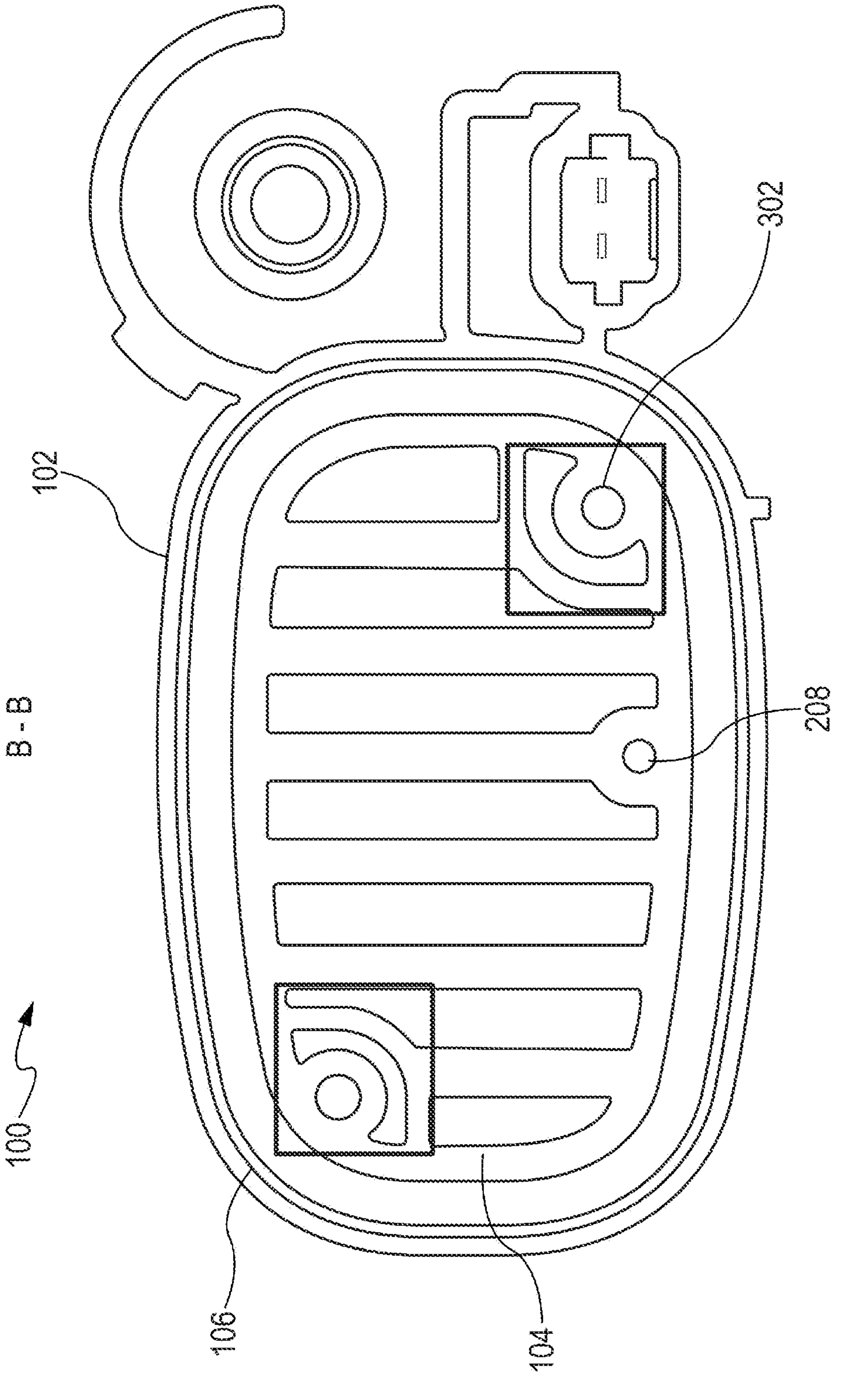
FIG. 3 shows a section perspective view of the lighting device along plane B-B of FIG. 2, according to an embodiment of the present invention.

FIG. 3 shows a section's perspective view of the lighting device 100 along a plane B-B of FIG. 2 according to an embodiment of the present invention. The lighting device 100 includes the housing enclosure 102 that contains a light source (described but not shown in figures) and other optical components such as a reflector, light guide or the like. The sealing member 106 is inserted into the housing enclosure 102. The sealing member 106 can represent a gasket or a seal that is applied to secure and protect the housing enclosure 102 from moisture, dust particles or against other environmental contaminants. The sealing member 106 can represent manufactured forms using one or more elements fabricated from polymeric, elastomeric, rubberized, silica or suitably formed material. The sealing member 106 also can also provide dampened cushioning to the lighting device 100 to address vibration effects that occur during harsh road or off-road conditions when the applied to vehicles operate through harsh roadable, extreme or non-road terrains. Subsequent to the sealing member 106, the heatsink 104 is attached to the housing enclosure 102 such that the heatsink 104 is placed in contact with the housing enclosure 102 via the sealing member 106. The heatsink 104 is attached to the housing enclosure 102 by the fasteners 108 (removed for illustration clarity and not shown in the figure). The fasteners 108 can include at least one mechanical structural means with or without intermediate inserts. By way of examples, the fasteners 108 can include but are not limited to screws, bolts, rivets, toggles, anchors, nuts, spring locks, mechanical connectors, welds or any combinational arrangement thereof or any suitable means of attachment. The fastener 108 that is insertable through an aperture 302 is disposed in the housing enclosure 102. The aperture 302 is adapted to receive the fasteners 108 as shown in FIG. 1. The fastener 108 insertable via the aperture 302 is configured to secure the heatsink 104 with the housing enclosure 102.

Figure 4:
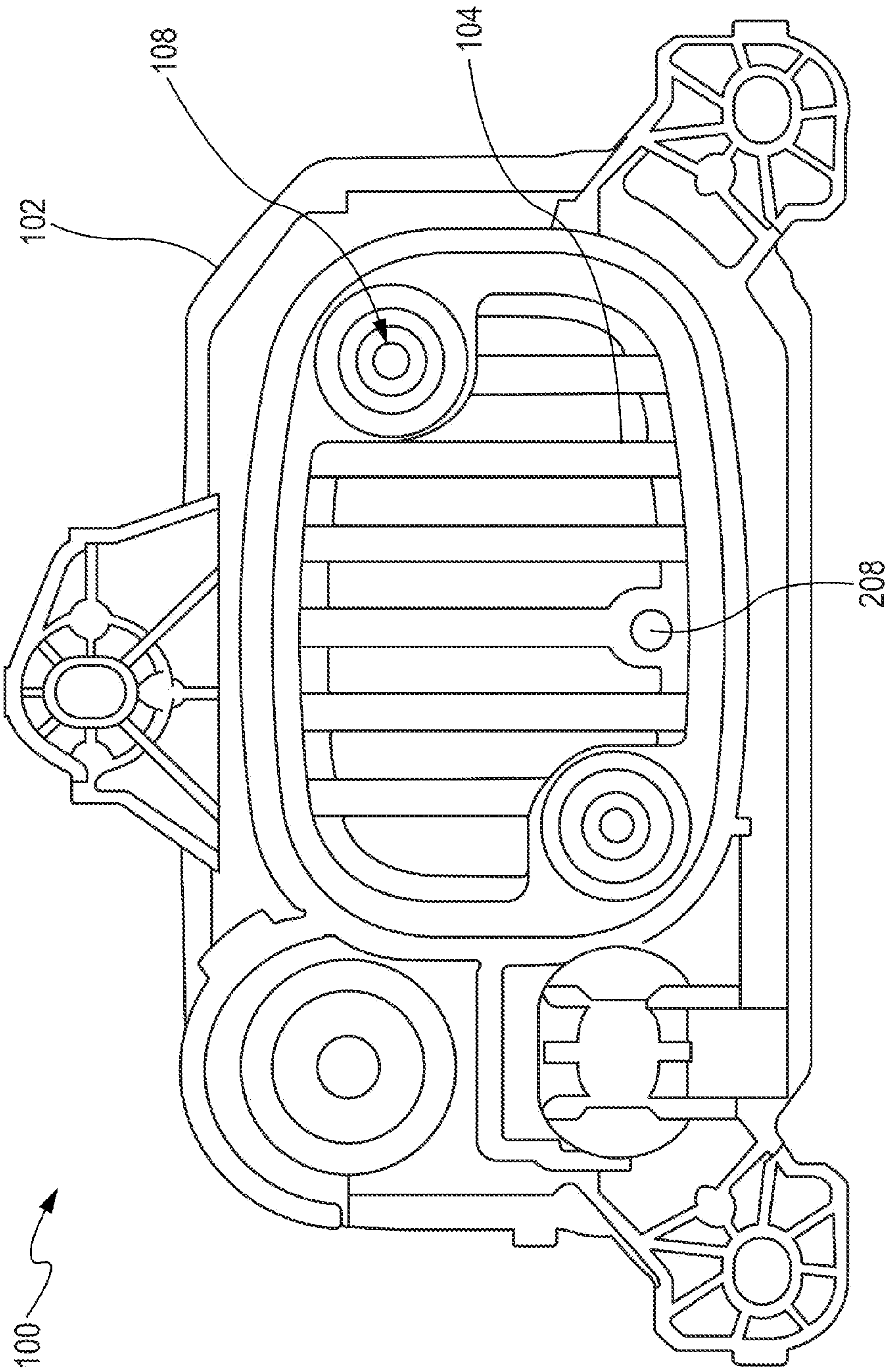
FIG. 4 shows a principal view of the assembled lighting device, according to an embodiment of the present invention.

FIG. 4 depicts a principal view of the assembled lighting device 100, according to an embodiment of the present invention. As can be seen from the figure, the lighting device 100 includes the housing enclosure 102 attached with the heatsink 104 along an outer surface of the housing enclosure 102. At least a portion of the heatsink 104 is configured to be in thermal contact with the housing enclosure 102 to dissipate heat generated from inside the housing enclosure 102. The heatsink 104 is attached to the housing enclosure 102 by the fastener 108 such as a fastening screw or other securing hardware. Because the heatsink 104 is attached within the housing enclosure 102, any void or wasted space inside the housing enclosure 102 resulting from the heatsink's 104 emplacement is significantly reduced or substantially eliminated. Moreover, although the heatsink 104 and the housing enclosure 102 are two distinct components, the two components are integrated by the fastening system 114 that forms the unitary assembled lighting device 100 that can be attached to off-road utility vehicles as a single component module.

Figure 5:
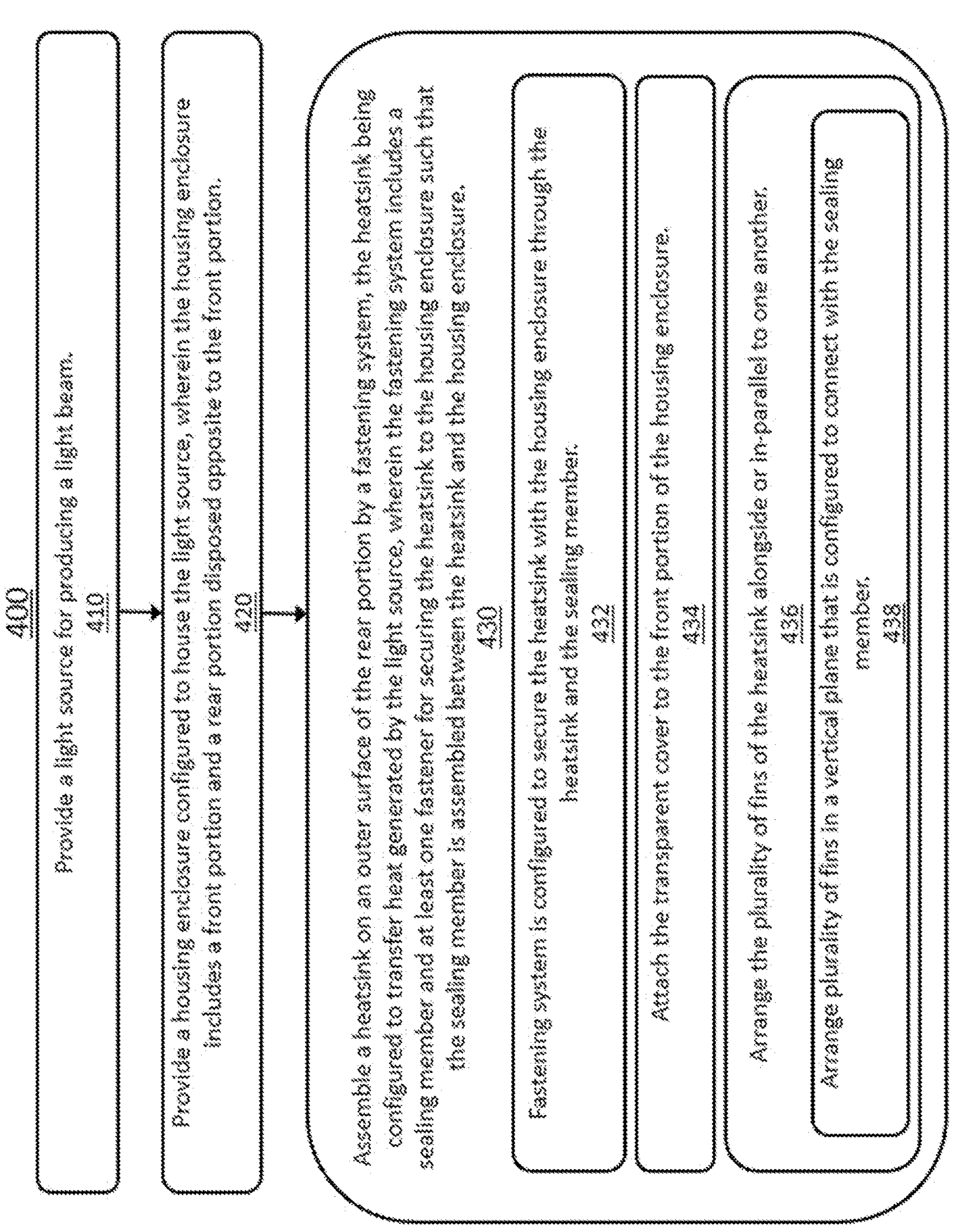
FIG. 5 depicts a method of the inventive lighting device, according to a flow-chart embodiment of the present invention.

FIG. 5 illustratively shows and describes the method 400 of assembling the inventive lighting device for off-road utility vehicles. For example, two blocks shown in succession may, in fact, be executed substantially concurrently or the blocks may sometimes be executed in the reverse order, depending upon the functionality involved. It will also be noted that each block of the block diagrams or flowchart illustration, and combinations of blocks in the block diagrams or flowchart illustration, can be implemented by both manual or automated systems that perform the specified functions or acts or carry out combinations of special purpose hardware and control instructions.

In block 410, provide a light source for producing a light beam. In block 420, provide a housing enclosure that is configured to contain light sources wherein the housing enclosure includes a front portion and a rear portion disposed opposite to the front portion. In block 430, assemble the heatsink on an outer surface of the rear portion by a fastening system such that the heatsink is configured to transfer heat that's generated by light sources, wherein the fastening system includes a sealing member and at least one fastener for securing the heatsink to the housing enclosure such that the sealing member is assembled between the heatsink and the housing enclosure.

In block 432, the fastening system is configured to secure (through the heatsink and the sealing member) the heatsink with the housing enclosure. In block 434, attach the transparent cover to the front portion of the housing enclosure. In block 436, arrange the plurality of fins of the heatsink alongside one another such that arranging the plurality of fins of the heatsink is placed in parallel or closely arranged to one another. In block 438, arrange the plurality of fins in a vertical plane that is configured to connect with the sealing member.

The method 400 reduces assembly times for the lighting device in a factory since the fastening system is simplified. Therefore, the manufacturing costs are reduced in addition to enabling the lighting device to reach markets from the factory at reduced time intervals.

Although the present disclosure provides references to figures, all embodiments shown in the figures are intended to explain preferred embodiments of the present invention by way of example rather than being intended to limit the present invention. Preferred embodiments of the present invention have been disclosed. However, it should be apparent to a person of ordinary skill in the art that certain modifications would come within the teachings of this invention and that various changes or modifications can be made in the present disclosure without departing from the principles and spirit of the disclosure, which are intended to be covered by the present invention as long as these changes or modifications fall within the scope defined in the claims and their equivalents.

LIST OF ELEMENT NUMBERS

Lighting device assembly 100
Light Source 101
Housing Enclosure 102
Heatsink 104
Sealing Member 106
Fasteners 108
Front Portion 110
Rear Portion 112
Fastening System 114
Transparent Cover 202
Protection member 206
Plurality of Fins arranged alongside or in Parallel 204
Fin element (arranged alongside or in parallel) **204*a***
Seal cross-section **204*b***
Vent 208
Aperture 302

What is claimed is:

1. A lighting device of a utility vehicle, said device comprising:
- a light source for producing a light beam;
- a housing enclosure with a transparent cover that encapsulates the light source, the light source packaged within the housing enclosure;
- a sealing member and a heatsink in an assembled condition, wherein the housing enclosure includes a front portion and a rear portion disposed opposing the front portion; and
- a number of fins of the heatsink that extend from beyond the front portion and that span through to the rear portion where a rear arrangement of fins extend beyond the housing enclosure, where a front arrangement of fins at the front portion are spaced apart from the rear arrangement of fins at the rear portion by the housing enclosure, the rear arrangement of fins configured to protrude beyond the housing enclosure;
- wherein the heatsink, the sealing member and the housing enclosure are assembled together by a fastening system through securing hardware that forms a structure configured to transfer heat generated by the light source.

2. The lighting device according to claim 1, wherein the at least one fastener is configured to secure the heatsink with the housing enclosure through the heatsink and the sealing member.

3. The lighting device according to claim 1, wherein a number of portions of the heatsink are in thermal contact with the light source.

4. The lighting device according to claim 1, wherein the at least one fastener is at least one of a mechanical structural means or an intermediate insert.

5. The lighting device according to claim 1, wherein the sealing member is formed from one or more of polymeric or silica material.

6. The lighting device according to claim 1, wherein the light source is a light emitting diode (LED).

7. The lighting device according to claim 1, wherein the fastening system further includes a protection member configured to protect the at least one fastener.

8. The lighting device according to claim 1, wherein the heatsink includes the number of fins arranged alongside or in parallel to one another.

9. The lighting device according to claim 8, wherein the number of fins are arranged in a vertical plane that is configured to connect with the sealing member.

10. The lighting device according to claim 1, further including a vent disposed at the rear portion of the housing enclosure.

11. A method of assembling a lighting device for a utility vehicle, the method comprising:
- providing a light source for producing a light beam;
- providing a housing enclosure with a transparent cover that packages the light source within the housing enclosure, a sealing member and a heatsink in an assembled condition, wherein the housing enclosure includes a front portion and a rear portion disposed opposite to the front portion; and
- producing a number of fins along the heatsink that extend from beyond the front portion and that span through to the rear portion where a rear arrangement of fins extend beyond the housing enclosure, where a front arrangement of fins at the front portion are spaced apart from the rear arrangement of fins at the rear portion by the housing enclosure, the rear arrangement of fins configured to protrude beyond the housing enclosure;
- assembling the heatsink, the sealing member and the housing enclosure together by a fastening system that forms a structure configured to transfer heat generated by the light source.

12. The method of assembling a lighting device according to claim 11, wherein the fastening system is configured to secure the heatsink with the housing enclosure through the heatsink and the sealing member.

13. The method of assembling a lighting device according to claim 11, further that includes attaching the transparent cover to the front portion of the housing enclosure.

14. The method of assembling a lighting device according to claim 11, wherein the heatsink includes a plurality of fins arranged alongside or in parallel to one another.

15. The method of assembling a lighting device according to claim 14, wherein the plurality of fins are arranged in a vertical plane that is configured to connect with the sealing member.

16. The method of assembling a lighting device according to claim 11, wherein at least a part of the heatsink is in thermal contact with the light source.

17. The method of assembling a lighting device according to claim 11, wherein the fastening system further comprises a protection member configured to protect the fastener.

18. The method of assembling a lighting device according to claim 11, further comprises disposing a vent at the rear portion of the housing enclosure.

19. The method of assembling a lighting device according to claim 11, wherein the sealing member is made by a seal formed from one or more of a polymeric or silica material.

20. A lighting device for a utility vehicle, said device comprising:

a light source configured to produce a light beam;

a housing enclosure with a transparent cover that packages the light source within the housing enclosure;

a sealing member and a heatsink in an assembled structure that is secured together by a fastening system; where the housing enclosure includes a front portion and a rear portion disposed opposite to the front portion;

a number of fins of the heatsink that extend from beyond the front portion and that span through to the rear portion where a rear arrangement of fins extend beyond the housing enclosure; and where a front arrangement of fins are spaced apart from a rear arrangement of fins by the housing enclosure, the rear arrangement of fins configured to protrude beyond housing enclosure;

the sealing member emplaced between the heatsink and an inner wall of the housing enclosure along the rear portion; and where the heatsink that is in thermal contact with the housing enclosure is configured to transfer heat generated by the light source.

* * * * *